Oct. 29, 1968   D. F. WARNER   3,407,802
PORTABLE BARBECUE COOKING DEVICE
Filed May 6, 1966   2 Sheets-Sheet 1

INVENTOR.
DONALD F. WARNER.
BY
D. Emmett Thompson
ATTORNEY.

Oct. 29, 1968 D. F. WARNER 3,407,802
PORTABLE BARBECUE COOKING DEVICE
Filed May 6, 1966 2 Sheets-Sheet 2
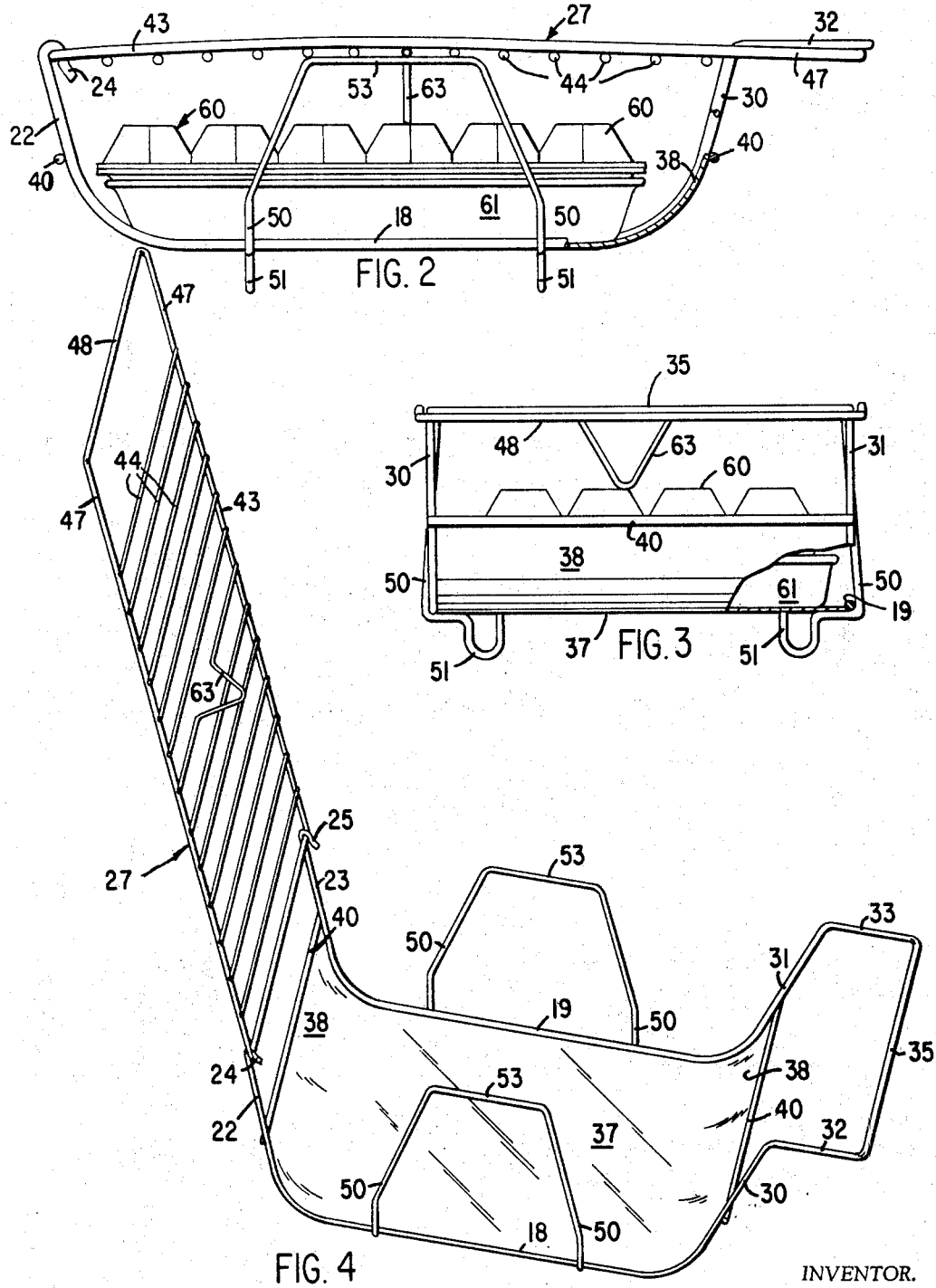
INVENTOR.
DONALD F. WARNER.
BY
D. Emmett Thompson,
ATTORNEY.

United States Patent Office 3,407,802
Patented Oct. 29, 1968

3,407,802
PORTABLE BARBECUE COOKING DEVICE
Donald F. Warner, Stamford, N.Y., assignor to Timberland Products Co., Inc., Stamford, N.Y., a corporation of New York
Filed May 6, 1966, Ser. No. 548,298
2 Claims. (Cl. 126—25)

ABSTRACT OF THE DISCLOSURE

A small barbecue cooking device adapted to be carried in one hand. The device includes a frame and grill formed of light weight rod material including integral handle portions in overlying relation and interlocked snap-fashion when the grill is in closed cooking position. There is a sheet metal support for supporting the fire.

---

This invention relates to a portable barbecue cooking device of the type including a grill for supporting the articles to be cooked and including a fire pan for containing a charcoal fire.

This invention has as an object a relatively small, compact, light-weight, barbecue cooking device which may be conveniently carried in the hand, after the fashion of a lady's purse, and is particularly adapted to be transported in the hand for picnics, beach parties, and the like, the device embodying a novel structural arrangement by which the device can be made in volume at low cost.

The invention consists in the novel features and in the combinations and constructions hereinafter set forth and claimed.

In describing this invention, reference is had to the accompanying drawings in which like characters designate corresponding parts in all the views.

In the drawings—

FIGURE 2 is a side elevational view.

FIGURE 3 is an end elevational view looking to the left, FIGURES 1 and 2, and

FIGURE 4 is a perspective view showing the grill member moved to open position.

Figure 1:
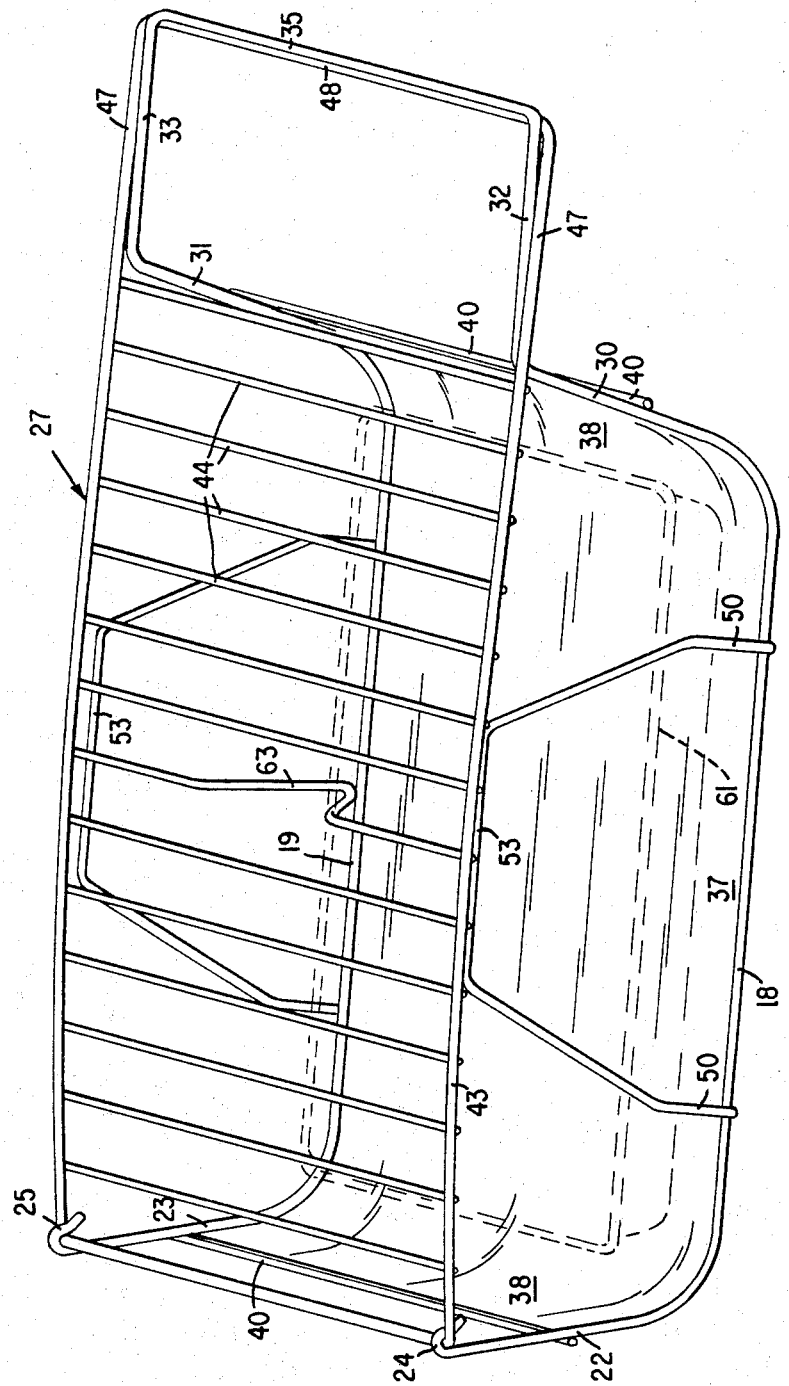
FIGURE 1 is a perspective view of a barbecue cooking device embodying my invention.

The device consists of a frame member including a pair of rods having substantially straight intermediate portions 18, 19, extending in spaced apart parallel relation. Like ends of these rods are bent upwardly, as at 22, 23, and are bent over to form hook portions 24, 25, which serve to form a hinge connection with the grill, indicated at 27.

The opposite ends of the rods 18, 19, extend upwardly, as at 30, 31, and rearwardly as at 32, 33, in a direction parallel to the intermediate portions 18, 19, the extending portions 32, 33, being connected by a transversely extending portion 35 to provide a carrying handle for the device. In the form shown, the rod structure of the frame is formed of one piece, the handle consisting of the portions 32, 33, 35, being integral with the rods.

A fire pan 37 is positioned in the frame structure and is preferably formed with upwardly extending end portions 38. The fire pan is formed of sheet metal and is fixed to the frame rods as by being spot welded thereto, and the upper edges of the end portions 38 are likewise fixed to cross members 40 in the nature of rods extending between the end portions 22, 23 and 30, 31, of the frame rods and affixed thereto, as by spot welding.

The frame and the fire pan 37 are of rectangular formation. There is a rectangular grill formed by a rectangular rod structure 43 provided with transversely extending bars 44 affixed thereto. One end of the rectangular grill frame 43 is mounted in the hook portions 24, 25, of the frame. The rod frame 43 of the grill 27 is formed at the end, opposite to that positioned in the hinge hooks 24, 25, with extending side portions 47 and a transversely extending portion 48. These portions 47, 48, of the grill provide a handle portion therefor comparable to the frame handle 32, 33, 35. In FIGURE 4, the grill 27 is shown in the open position. In the remaining figures, the grill is shown in closed position in which it extends substantially parallel to the intermediate flat portion of the fire pan.

When the grill 27 is moved to the flat cooking position, the cross portion 48 of the grill handle is positioned slightly inside of the cross portion 35 of the frame handle. However, the upwardly extending portions 22, 23 and 30, 31, of the rod frame structure provide a degree of resiliency, permitting the cross member 35 of the frame structure to be moved toward the hinge hooks 24, 25. The side members 47 of the grill handle portion are spaced apart a greater distance than the spacing of the side portions 32, 33, of the frame handle. The result is that the cross member 48 of the grill handle portion can be snapped downwardly over the cross portion 35 of the frame handle, whereupon it moves under the same, as shown in FIGURE 1, whereby the grill, in the cooking position, becomes detachably interlocked with the frame.

In order to maintain the interlocked relation between the grill and the frame, and for other reasons, the frame is provided at each side with side members extending upwardly at each side of the frame and the fire pan. These side members are also of rod structure. They are, in general, of inverted U-shape formation. The lower ends of the leg portions 50 of the side members are fixedly secured to the intermediate portions 18, 19, of the frame rods, and may be bent inwardly and formed with vertically disposed U portions 51, which form feet for supporting the cooking device. The upper cross or connecting portions 53 of the side members are positioned to be engaged by the grill when it is moved to the closed cooking position, as shown in FIGURES 1 and 2. The height of the intermediate portions 53 is such that they are engaged by the cross rods 44 of the grill prior to the movement of the grill handle portion underneath the frame handle portion.

With this arrangement, the intermediate portion of the grill is slightly bowed, as shown in FIGURE 2, and the interlocking engagement between the grill handle and the frame handle is maintained.

In the arrangement disclosed, it will be apparent that the device is provided with a handle formed partially integral with the frame, and partially integral with the grill, whereby the device can conveniently be carried in the hand.

The fuel may consist of charcoal briquettes 60 in the form of an integral assembly, wherein the briquettes are enclosed in a paperboard container, this assembly being a staple product on the market. Preferably, the briquette assembly is positioned in a disposable container 61, usually formed of aluminum foil. One of the cross members 44, located in the central portion of the grill, is bent downwardly to form a U-shaped projection 63 positioned to engage the briquette assembly 60 to properly maintain the same in place during manual handling and transportation of the cooking device.

What I claim is:

1. A cooking device comprising a frame including a pair of side rods having substantially straight intermediate portions and upwardly extending end portions, cross members fixed to said rods and serving to maintain the same in spaced parallel relation, like ends of said rods being provided with hinge connections, the opposite ends of said rods being bent to extend parallel to said intermediate portions in a direction from said hinge connection to form a carrying handle for the device, a fire support of sheet material positioned between the intermediate portions of said side rods and being turned upwardly at its ends and fixed to said frame, a grill connected at one end to said hinge connections, the opposite end of said grill being formed with a handle shaped complemental to said frame handle and overlying the same, said grill being movable about said hinge connections toward and from said fire support to closed and open positions, an inverted U-shaped side member fixed to the intermediate portion of each side rod, the bight portions of said side members being positioned for engagement by the side edges of said grill when the same is moved toward closed position, said frame handle and said grill handle being adapted to interlock when said grill is moved to closed position.

2. A cooking device as defined in claim 1, wherein the side legs of said side members extend below the intermediate portions of said side rods and terminate in bent portions forming feet for supporting the device.

References Cited

UNITED STATES PATENTS

| | | | |
|---|---|---|---|
| 416,068 | 11/1889 | Muller | 126—25 |
| 1,091,877 | 3/1914 | Collis | 126—30 |
| 2,511,594 | 7/1950 | Loffredo | 126—25 X |
| 3,094,113 | 6/1963 | Avila | 126—25 |

FREDERICK KETTERER, *Primary Examiner.*